(12) United States Patent
Nishida (10) Patent No.: US 9,694,416 B2
(45) Date of Patent: Jul. 4, 2017

(54) WINDER (75) Inventor: Kihachiro Nishida, Hashima (JP)

(73) Assignees: Fuji Seiko Co., Ltd (JP); Fuji Shoji Co., Ltd. (JP)

( * ) Notice: Subject to any disclaimer, the term of this patent is extended or adjusted under 35 U.S.C. 154(b) by 343 days.

(21) Appl. No.: 14/387,473

(22) PCT Filed: Apr. 11, 2012

(86) PCT No.: PCT/JP2012/059934
§ 371 (c)(1),
(2), (4) Date: Sep. 23, 2014

(87) PCT Pub. No.: WO2013/153641
PCT Pub. Date: Oct. 17, 2013

(65) Prior Publication Data
US 2015/0083270 A1  Mar. 26, 2015

(51) Int. Cl.
*B21F 37/00* (2006.01)
*B29D 30/48* (2006.01)

(52) U.S. Cl.
CPC ............... *B21F 37/00* (2013.01); *B29D 30/48* (2013.01); *B29D 2030/487* (2013.01); *B29D 2030/488* (2013.01)

(58) Field of Classification Search
CPC ......... B21F 37/00; B29D 30/48; B29D 30/50; B29D 2030/487; B29D 2030/488
See application file for complete search history.

(56) References Cited

U.S. PATENT DOCUMENTS

| 3,741,262 A | 6/1973 | Bell et al. |
| 3,881,526 A | 5/1975 | Bell et al. |
| 5,108,538 A | 4/1992 | Kokubu et al. |
| 2001/0023737 A1 | 9/2001 | Caretta et al. |

FOREIGN PATENT DOCUMENTS

| CN | 201040424 Y | 3/2008 |
| CN | 102294416 A | 12/2011 |
| JP | 53-15019 B2 | 5/1978 |
| JP | 54-23031 B2 | 8/1979 |
| JP | S60148636 A | 8/1985 |
| JP | 6-155633 A | 6/1994 |
| JP | 9-267410 A | 10/1997 |
| RU | 2213008 C2 | 9/2003 |

(Continued)

OTHER PUBLICATIONS

Translation of the International Preliminary Report on Patentability for PCT/JP2012/059934, mailed Jul. 17, 2012, pp. 1-5.

(Continued)

*Primary Examiner* — Debra Sullivan
(74) *Attorney, Agent, or Firm* — Tarolli, Sundheim, Covell & Tummino LLP (57) ABSTRACT

A winding machine includes a first rotary body to be rotated by a rotary shaft, and a second rotary body to rotate on the same axis as the first rotary body and at the same speed as the first rotary body. The winding machine further includes a cylinder to open and close the first and second rotary bodies relative to each other. An outer circumferential surface of at least one of the first and second rotary bodies in a part where the first and second rotary bodies join is provided with a groove in which a bead ring is to be formed by winding a wire.

3 Claims, 5 Drawing Sheets

(56) References Cited

FOREIGN PATENT DOCUMENTS

SU  1381002 A1  3/1988
SU  1740194 A   6/1992

OTHER PUBLICATIONS

International Search Report for corresponding PCT/JP2012/059934, completed Jul. 6, 2012 by the Japanese Patent Office.
Office Action for Application No. 2014140595 dated Mar. 31, 2016.
Chinese Office Action for Application Serial No. 201280072002.0, dated Aug. 3, 2015, pp. 1-12.

WINDER

RELATED APPLICATIONS

The present invention is a U.S. National Stage under 35 USC 371 patent application, claiming priority to Serial No. PCT/JP2012/059934, filed on 11 Apr. 2012; the entirety of which is incorporated herein by reference.

FIELD OF THE INVENTION

This invention relates to a winder that forms a bead ring by winding a wire around the outer circumferential surface of a rotary body.

BACKGROUND OF THE INVENTION

A winding machine of this type is disclosed for example in Patent Document 1. The winding machine includes a rotary body to form a bead ring. The rotary body is formed of a substrate to be rotated by a rotary shaft, and multiple partitioned strips attached to an outer circumferential part of the substrate and capable of moving in a radial direction. Each of the partitioned strips has a side surface formed into an arcuate shape. The outer circumferential surface of each of the partitioned strips is provided with a groove part in which a wire is aligned in rows and stacked in tiers while the wire is wound. Each of the partitioned strips is moved outward (toward a position of a larger diameter) in the radial direction of the substrate by driving means such as a cylinder. Then, the rotary body is rotated by the rotary shaft. This winds the wire in the groove part of each of the partitioned strips to form a bead ring. After formation of the bead ring, each of the partitioned strips is moved inward (toward a position of a smaller diameter) in the radial direction of the substrate by the driving means. In this condition, the bead ring is detached from the inside of the groove part of the partitioned strip.

As described above, in the aforementioned conventional winding machine, the rotary body is formed of the substrate and the multiple partitioned strips attached to the outer circumferential part of the substrate and each of the partitioned strips can be moved by the driving means between the position of a larger diameter and the position of a smaller diameter. This complicates the structure of the rotary body and takes time for detaching the bead ring on the rotary body from the rotary body.

PRIOR ART DOCUMENTS

Patent Documents

Patent Document 1: Japanese Laid-Open Patent Publication No. 9-267410

SUMMARY OF THE INVENTION

It is an object of this invention to provide a winding machine including a rotary body of a simple structure and capable of detaching a bead ring on the rotary body readily from the rotary body.

To solve the aforementioned problem, one aspect of this invention provides a winding machine including: a first rotary body to be rotated by a rotary shaft; a second rotary body to be rotated on the same axis as the first rotary body and at the same speed as the first rotary body; and a driving member to open and close the first and second rotary bodies relative to each other. An outer circumferential surface of at least one of the first and second rotary bodies in a part where the first and second rotary bodies join is provided with a groove in which a bead ring is to be formed by winding a wire.

In this structure, closing the first and second rotary bodies relative to each other with the driving member closes a lateral part of the groove formed in the outer circumferential surface of the part where the first and second rotary bodies join. In this condition, the rotary shaft rotates the rotary bodies to wind the wire in the groove, thereby forming the bead ring. After formation of the bead ring, the driving member opens the first and second rotary bodies relative to each other. Then, the lateral part of the groove in which the bead ring is formed by winding is exposed. This simplifies the structure of a rotary body compared to the conventional structure where the rotary body is formed of a substrate and multiple partitioned strips while making it possible to detach the bead ring on the rotary body readily from the rotary body.

In the aforementioned winding device, it is preferable that the winding device further includes an extruding member to extrude the bead ring formed by winding from the inside of the groove.

In the aforementioned winding device, it is preferable that an outer circumferential part of at least one of the first and second rotary bodies is provided with a grasping member to grasp a beginning of the wire.

In the aforementioned winding device, it is preferable that the grasping member is configured such that it can move in an axis direction of the rotary shaft, and that the winding machine further includes a biasing member to bias the grasping member toward a rotary body opposite the grasping member.

This invention is capable of simplifying the structure of a rotary body and detaching a bead ring on the rotary body readily from the rotary body.

DETAILED DESCRIPTION OF THE PREFERRED EMODIMENTS (First Embodiment)

A first embodiment that embodies a winding machine of this invention is described below by referring to FIGS. 1 to 5.

Figure 1:
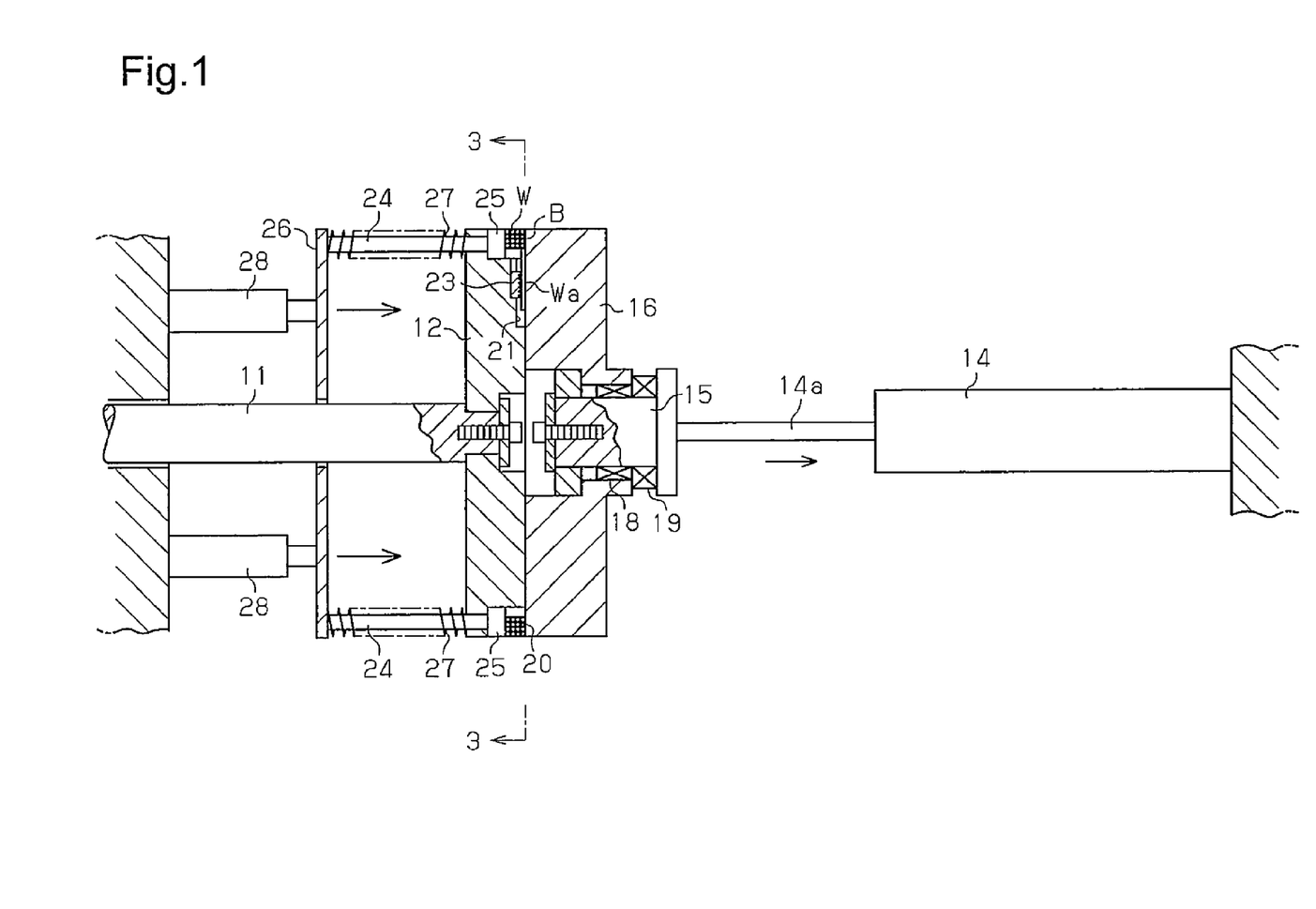
FIG. 1 is a sectional view showing a winding machine according to a first embodiment of this invention.
Figure 4:
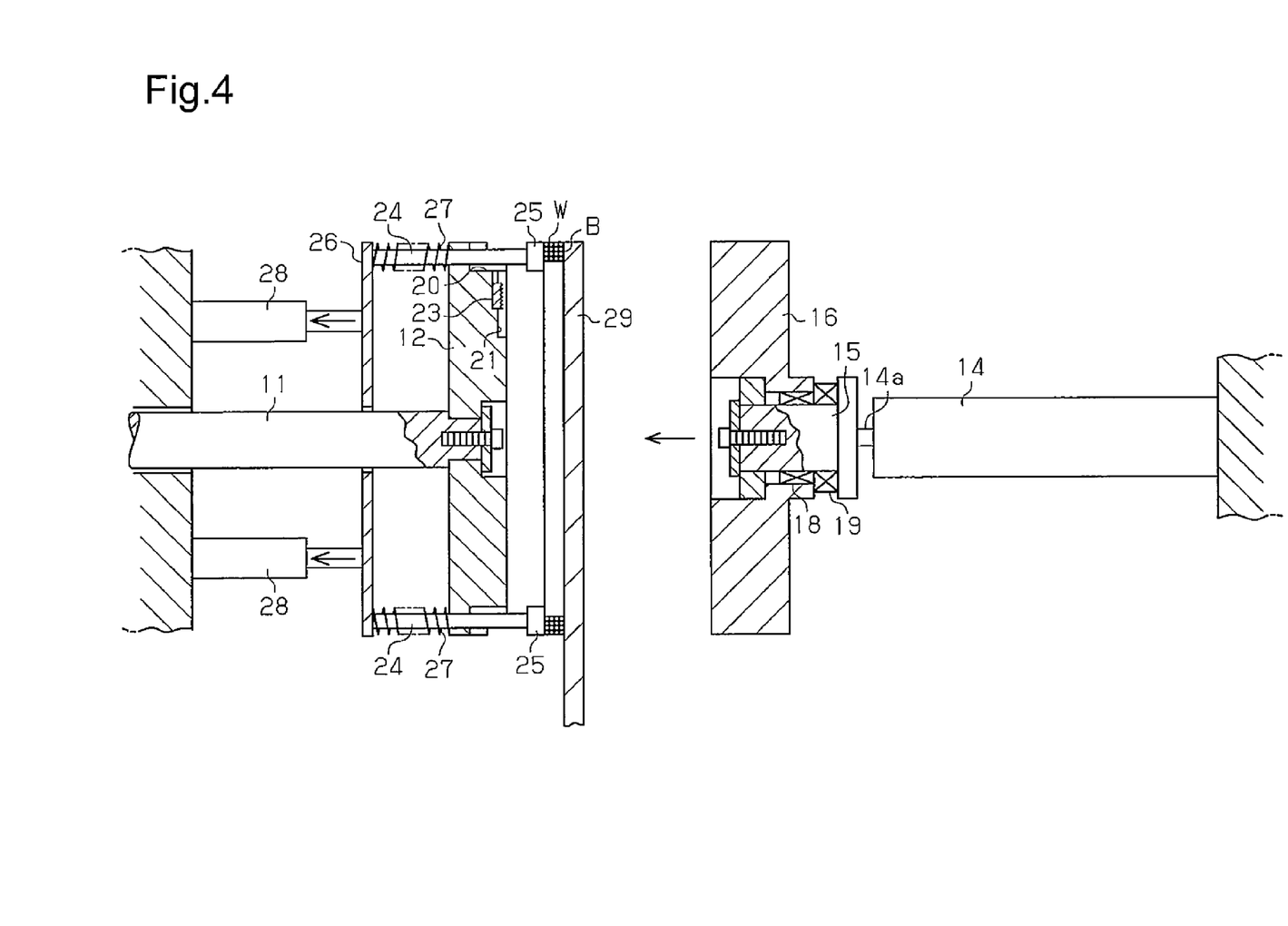
FIG. 4 is a sectional view showing the winding machine of FIG. 1 in an operating condition.

As shown in FIG. 1, a first rotary body 12 of a disk shape is attached to a tip of the rotary shaft 11. The first rotary body 12 is rotated together with a rotary shaft 11 by a motor not shown in the drawings. A cylinder 14 is arranged as a driving member lateral to the first rotary body 12 and on the axis line of the rotary shaft 11. The cylinder 14 includes a piston rod 14a having a tip provided with a support shaft 15. The support shaft 15 supports a second rotary body 16 of a disk shape through a radial bearing 18 and a thrust bearing 19. The second rotary body 16 can rotate on the same axis as the first rotary body 12. In response to projecting action of the cylinder 14, the second rotary body 16 is joined to the first rotary body 12 to close the rotary bodies 12 and 16 relative to each other as shown in FIG. 1. In this condition, the rotary shaft 11 rotates to make the rotary bodies 12 and 16 rotate integrally at the same speed. Meanwhile, in response to depressing action of the cylinder 14, the second rotary body 16 is separated from the first rotary body 12 to open the rotary bodies 12 and 16 relative to each other as shown in FIG. 4.

Figure 2:
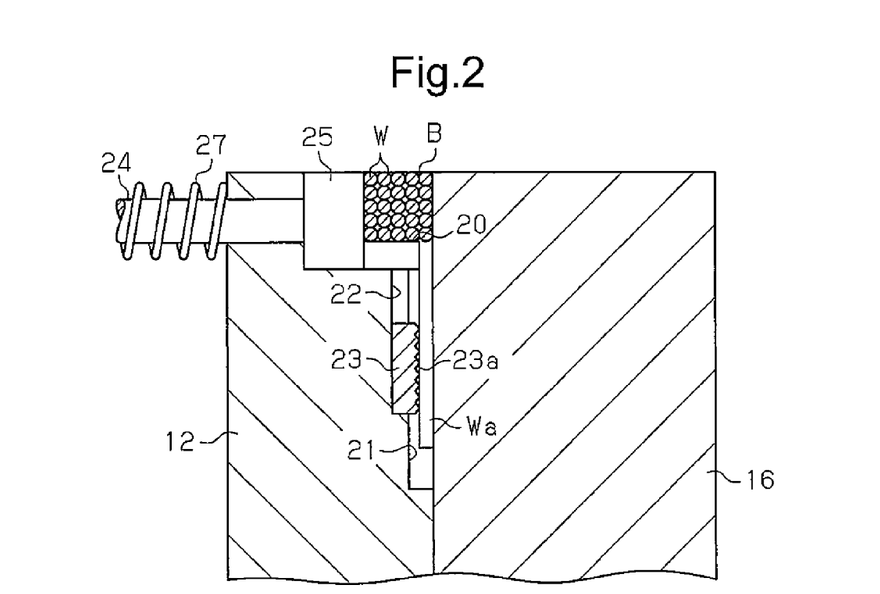
FIG. 2 is a partial sectional view showing part of FIG. 1 in an enlarged manner.

As shown in FIGS. 1 and 2, the outer circumferential surface of the first rotary body 12 in a part where the first and second rotary bodies 12 and 16 join is provided with a groove 20 that is exposed in a part facing the second rotary body 16. In response to action of the cylinder 14, the rotary bodies 12 and 16 are opened and closed relative to each other, thereby closing or exposing the part of the groove 20 facing the second rotary body 16. Closing the rotary bodies 12 and 16 relative to each other closes the part of the groove 20 facing the second rotary body 16. In this condition, a wire W is wound in the groove 20 while the rotary bodies 12 and 16 rotate integrally, thereby forming a bead ring B.

Figure 3:
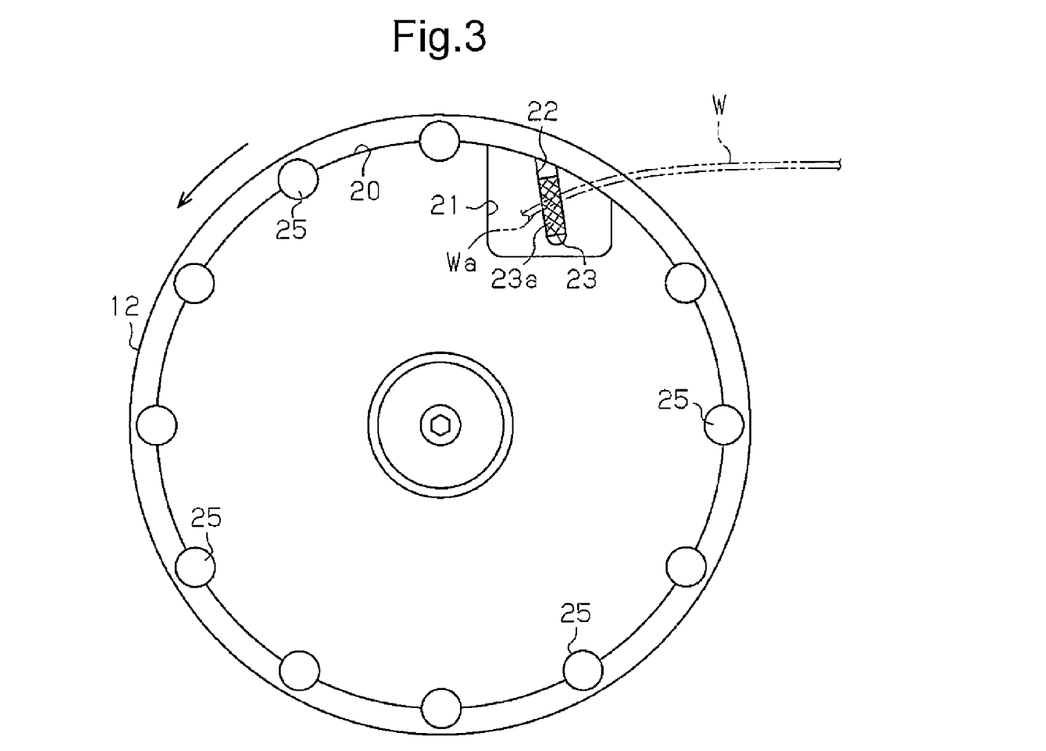
FIG. 3 is a sectional view taken along line 3-3 of FIG. 1.

As shown in FIGS. 1 to 3, the part of the first rotary body 12 where the first and second rotary bodies 12 and 16 join is provided with a recessed part 21 having an opening in the groove 20. A housing groove 22 is formed in the inside surface of the recessed part 21. The housing groove 22 houses a grasping member 23 to grasp a beginning Wa of the wire W. The grasping member 23 has a side surface provided with an anti-slip part 23a such as a knurled part. As shown by chain lines of FIG. 3, at the start of winding of the wire W into the groove 20, the beginning Wa of the wire W supplied into the recessed part 21 is grasped by the grasping member 23 and the second rotary body 16.

As shown in FIGS. 1 to 3, multiple rods 24 are provided to penetrate the outer circumferential edge of the first rotary body 12. The rods 24 are supported such that they can move in the axis direction of the rotary shaft 11. Each of the rods 24 has a tip provided with an extruding member 25. The extruding member 25 projects into the groove 20 to extrude the bead ring B formed by winding from the inside of the groove 20. An actuating plate 26 is arranged lateral to the first rotary body 12. Each of the rods 24 has a base end fixed to the actuating plate 26. A spring 27 is fitted to each of the rods 24 to extend between the actuating plate 26 and the first rotary body 12. The spring 27 biases a corresponding extruding member 25 in a direction that makes the extruding member 25 retreat from the inside of the groove 20. The actuating plate 26 is coupled to multiple extruding cylinders 28. When the cylinders 28 make projecting actions while the part of the groove 20 facing the second rotary body 16 is exposed, as shown in FIG. 4, each of the extruding members 25 projects into the groove 20 to extrude the bead ring B from the inside of the groove 20.

As shown in FIG. 4, while the rotary bodies 12 and 16 are opened relative to each other, a transferring plate 29 is arranged lateral to the first rotary body 12 to be opposite the first rotary body 12. The transferring plate 29 is formed of a permanent magnet that can attract the bead ring B. A side surface of the transferring plate 29 at an upper end thereof is formed into a semicircular shape so as to conform to the outer circumferential surface of the bead ring B. The bead ring B having been extruded from the inside of the groove 20 by the extruding members 25 is attracted to the transferring plate 29 and then transferred to a subsequent step.

The action of the aforementioned winding machine is described below.

Figure 5:
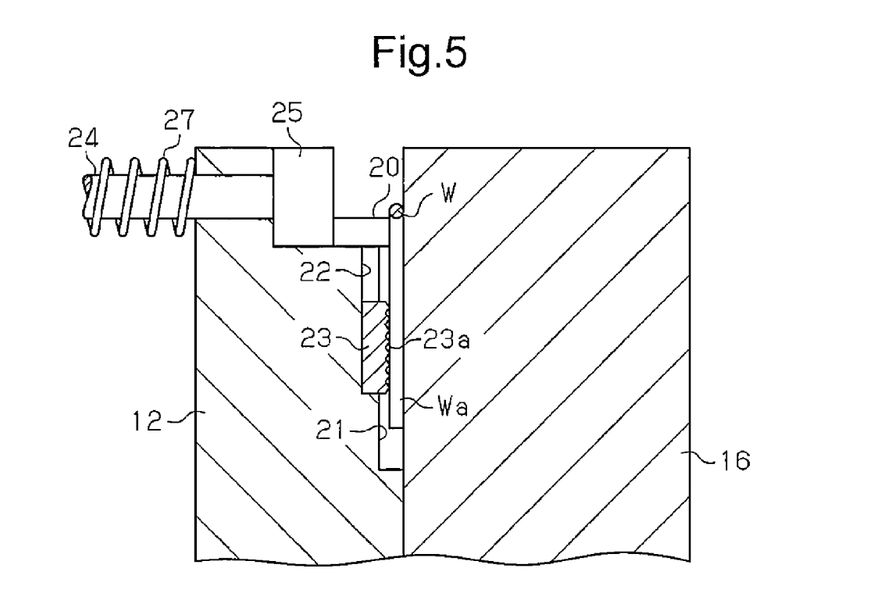
FIG. 5 is a partially enlarged sectional view showing the winding machine in an operating condition to come after the condition of FIG. 4.

FIGS. 1 and 2 show a condition where the cylinder 14 for opening and closing is in a projecting position, the first and second rotary bodies 12 and 16 are closed relative to each other, and the part of the groove 20 facing the second rotary body 16 is closed. Further, the extruding cylinders 28 are in their depressed positions. Thus, the extruding members 25 retreat from the inside of the groove 20 by means of biasing forces of the springs 27. As shown in FIGS. 3 and 5, when the wire W is fed into the recessed part 21 of the first rotary body 12 in this condition, the beginning Wa of the wire W is grasped by the grasping member 23 and the second rotary body 16. Next, the rotary shaft 11 rotates the rotary bodies 12 and 16 integrally. Then, as shown in FIGS. 1 and 2, the wire W is aligned in rows and stacked in tiers in the groove 20 while the wire W is wound. In this way, the bead ring B is formed.

After formation of the bead ring B is finished, the cylinder 14 for opening and closing is depressed. This opens the first and second rotary bodies 12 and 16 relative to each other to expose the part of the groove 20 facing the second rotary body 16 as shown in FIG. 4. Further, the transferring plate 29 is interposed between the first and second rotary bodies 12 and 16 to be arranged in a position opposite the first rotary body 12. In this condition, the cylinders 28 are made to project to make each of the extruding members 25 project into the groove 20. This extrudes the bead ring B laterally from the inside the groove 20, so that the bead ring B is attracted magnetically onto the transferring plate 29. At this time, in response to extruding the bead ring B from the inside of the groove 20, the beginning Wa of the wire W is pulled out from between the grasping member 23 and the second rotary body 16. Then, the transferring plate 29 moves to transfer the bead ring B to a subsequent step.

Next, the cylinder 14 for opening and closing is made to project. This closes the first and second rotary bodies 12 and 16 relative to each other to close the part of the groove 20 facing the second rotary body 16 as shown in FIGS. 1 and 5. Further, the extruding cylinders 28 are depressed. Thus, the extruding members 25 retreat from the inside of the groove 20 by means of biasing forces of the springs 27. In this condition, as shown in FIGS. 3 and 5, the beginning Wa of the wire W is fed into the recessed part 21 of the first rotary body 12 and the beginning Wa of the wire W is grasped by the grasping member 23 and the second rotary body 16. Next, the rotary shaft 11 rotates the rotary bodies 12 and 16 to start formation of a next bead ring B.

Accordingly, the first embodiment achieves the effects as follows.

(1) The winding machine includes the first rotary body 12 to be rotated by the rotary shaft 11 and the second rotary body 16 to rotate on the same axis as the first rotary body 12 and at the same speed as the first rotary body 12. The winding machine further includes the cylinder 14 functioning as a driving member to open and close the first and second rotary bodies 12 and 16 relative to each other. The outer circumferential surface of at least one of the first and second rotary bodies 12 and 16 in the part where the first and second rotary bodies 12 and 16 join is provided with the groove 20 in which the bead ring B is to be formed by winding the wire W.

Accordingly, if the cylinder 14 closes the first and second rotary bodies 12 and 16 relative to each other, the part of the groove 20 facing one of the first and second rotary bodies 12 and 16 is closed. In this condition, the rotary shaft 11 rotates the rotary bodies 12 and 16 to wind the wire W in the groove 20, thereby forming the bead ring B. After formation of the bead ring B, the cylinder 14 opens the first and second rotary bodies 12 and 16 relative to each other. Then, the part of the groove 20 facing one of the first and second rotary bodies 12 and 16 is exposed. This simplifies the structure of a rotary body compared to the conventional structure where the rotary body is formed of a substrate and multiple partitioned strips while making it possible to detach the bead ring B readily from the rotary body.

(2) The winding machine includes the extruding members 25 to extrude the bead ring B formed by winding from the inside of the groove 20. The extruding members 25 are used for extruding the bead ring B from the inside of the groove 20, so that the bead ring B on the rotary body can be detached more readily from the rotary body.

(3) The winding machine includes the grasping member 23 formed on an outer circumferential part of at least one of the rotary bodies 12 and 16 to grasp the beginning Wa of the wire W. Thus, at the start of winding of the wire W, the winding of the wire W can be started promptly while the grasping member 23 grasps the beginning Wa of the wire W.

(Second Embodiment)

A second embodiment that embodies the winding machine of this invention is described below. The following mainly describes a difference from the first embodiment.

Figure 6:
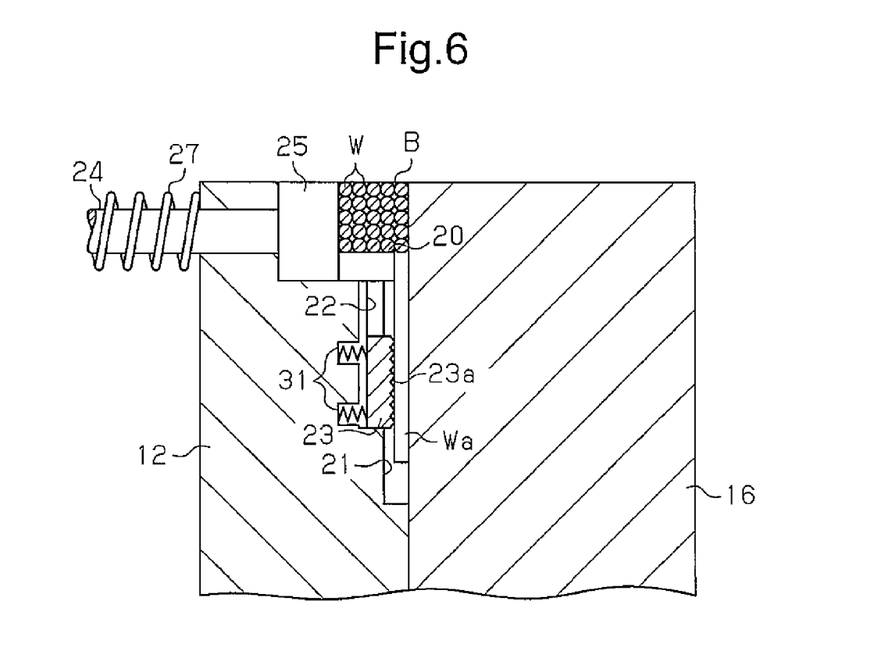
FIG. 6 is a partial sectional view showing a winding machine according to a second embodiment of this invention.

As shown in FIG. 6, the housing groove 22 houses the grasping member 23 such that the grasping member 23 can move in the axis direction of the rotary shaft 11. A spring 31 functioning as a biasing member is provided in the housing groove 22. The spring 31 biases the grasping member 23 toward the second rotary body 16. Thus, even if the diameter of the wire W is changed, the grasping member 23 and the second rotary body 16 can still grasp the beginning Wa of the wire W reliably as a result of application of the biasing force of the spring 31 to the grasping member 23.

Accordingly, the second embodiment achieves the following effect in addition to the effects (1) to (3) of the first embodiment.

(4) The grasping member 23 is configured such that it can move in the axis direction of the rotary shaft 11. The spring 31 biases the grasping member 23 toward a rotary body opposite the grasping member 23. Thus, even if the diameter of the wire W is changed, the grasping member 23 can still grasp the beginning Wa of the wire W reliably.

(Third Embodiment)

A third embodiment that embodies the winding machine of this invention is described below. The following mainly describes a difference from the first embodiment.

Figure 7:
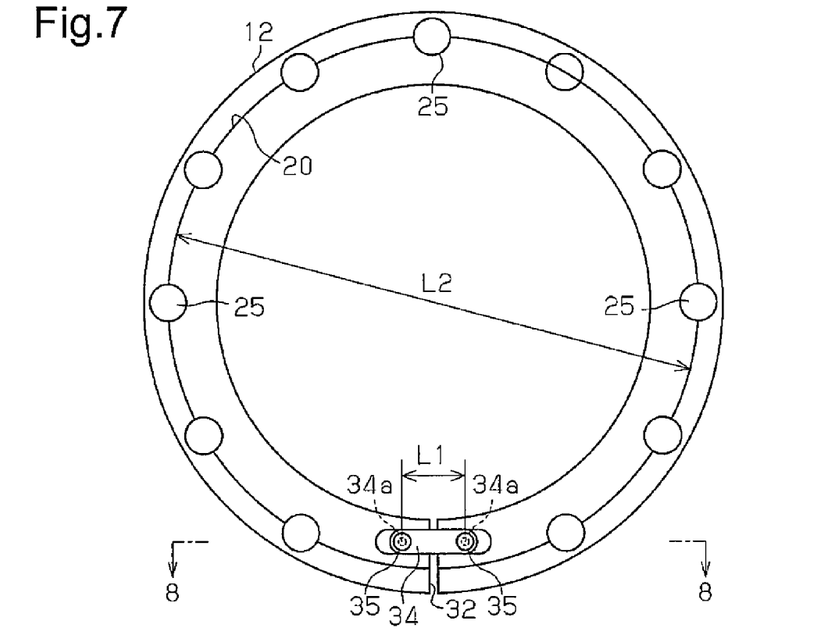
FIG. 7 is an end view showing a first rotary body of a winding machine according to a third embodiment of this invention.
Figure 8:
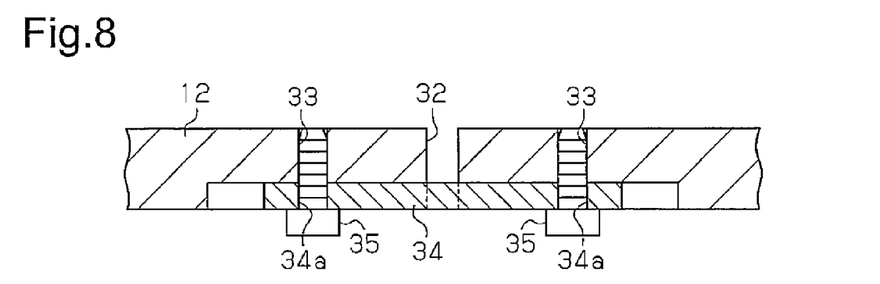
FIG. 8 is a sectional view taken along line 8-8 of FIG. 7.

As shown in FIGS. 7 and 8, the first rotary body 12 having an outer circumferential surface with the groove 20 is formed into an annular shape. A partitioning area 32 is formed in a part of the first rotary body 12. The first rotary body 12 has one screw hole 33 on each of opposite sides of the partitioning area 32. A coupling plate 34 is detachably attached to the partitioning area 32 of the first rotary body 12. One bolt insertion hole 34a is formed in each of opposite ends of the coupling plate 34. A bolt 35 inserted in each bolt insertion hole 34a is screwed into the screw hole 33. Several types of the coupling plates 34 are prepared for the winding machine. The coupling plates 34 of the several types differ from each other in a distance L1 between the bolt insertion holes 34a. The coupling plates 34 are attached selectively to the partitioning area 32 of the first rotary body 12, thereby changing the diameter of the inner bottom surface of the groove 20 on the first rotary body 12, specifically a winding diameter L2 of the bead ring B.

Accordingly, the third embodiment achieves the following effect in addition to the effects (1) to (3) of the first embodiment.

(5) The bead ring B can be changed easily in the winding diameter L2 only by exchanging the coupling plate 34. This easily achieves conformance to winding of bead rings B of different specifications.

(Fourth Embodiment)

A fourth embodiment that embodies the winding machine of this invention is described below. The following mainly describes a difference from the first embodiment.

Figure 9:
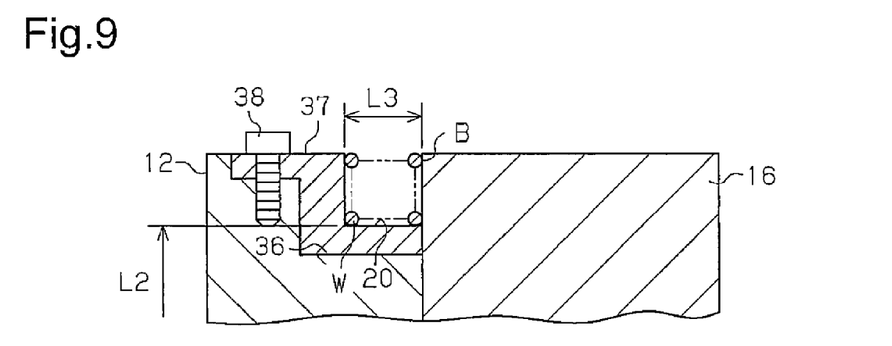
FIG. 9 is a partial sectional view showing a winding machine according to a fourth embodiment of this invention.

As shown in FIG. 9, the outer circumferential surface of the first rotary body 12 is provided with an attaching recessed part 36. An annular groove member 37 with the groove 20 is attached inside the attaching recessed part 36 with multiple bolts 38. Several types of the groove members 37 are prepared for the winding machine. The groove members 37 of the several types differ from each other for example in the diameter, width, or shape in cross section of the inner bottom surface of the groove 20. The groove members 37 are attached selectively inside the attaching recessed part 36, thereby changing the winding diameter L2, a winding width L3, or the shape in cross section of the bead ring B, for example.

Accordingly, the fourth embodiment achieves the following effect in addition to the effects (1) to (3) of the first embodiment.

(6) The bead ring B can be changed easily for example in the winding diameter L2, the winding width L3, or the shape in cross section only by exchanging the groove member 37. This readily achieves conformance to change in specifications of the bead ring B.

Each of the embodiments can be modified as follows.

The groove 20 in which the bead ring B is to be formed may be provided to the second rotary body 16 or may be provided so as to extend across the first and second rotary bodies 12 and 16.

The grasping member 23 may be provided to the second rotary body 16.

The invention claimed is:

1. A winding machine comprising:
   a first rotary body to be rotated by a rotary shaft;
   a second rotary body to be rotated on the same axis as the first rotary body and at the same speed as the first rotary body;
   a driving member to open and close the first and second rotary bodies relative to each other, wherein an outer circumferential surface of at least one of the first and second rotary bodies in a part where the first and second rotary bodies join is provided with a groove in which a bead ring is to be formed by winding a wire,
   an extruding member for extruding the formed bead ring from inside the groove, and
   a transferring plate configured to be interposed between the first rotary body and the second rotary body when the first and second rotary bodies are opened, the transferring plate being capable of magnetically attracting the bead ring that has been extruding from inside the groove by the extruding member.

2. The winding machine according to claim 1, wherein an outer circumferential part of at least one of the first and second rotary bodies is provided with a grasping member to grasp a beginning of the wire.

3. The winding machine according to claim 2, wherein the grasping member is configured such that it can move in a direction extending parallel to an axis about which the rotary shaft rotates, the winding machine further comprising a biasing member to bias the grasping member toward one of the first and second rotary bodies.

* * * * *

UNITED STATES PATENT AND TRADEMARK OFFICE
CERTIFICATE OF CORRECTION

PATENT NO. : 9,694,416 B2  
APPLICATION NO. : 14/387473  
DATED : July 4, 2017  
INVENTOR(S) : Kihachiro Nishida Page 1 of 1

It is certified that error appears in the above-identified patent and that said Letters Patent is hereby corrected as shown below:

In the Specification

Column 6, Line 64 reads "extruding" should read --extruded--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*